C. P. BARY.
FIELD MAGNET OR THE LIKE.
APPLICATION FILED OCT. 24, 1905.
910,892.
Patented Jan. 26, 1909.
2 SHEETS—SHEET 1.
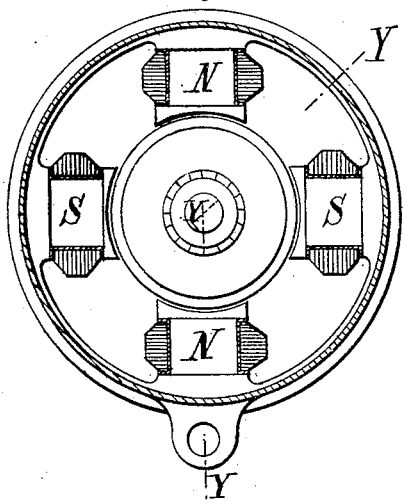
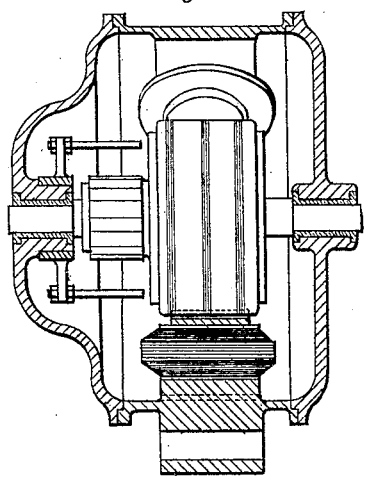
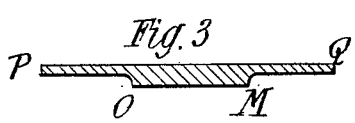
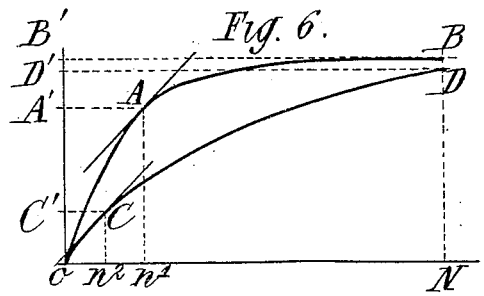
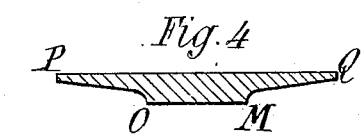
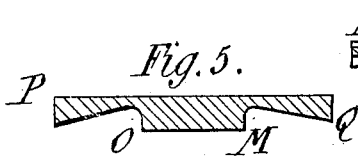
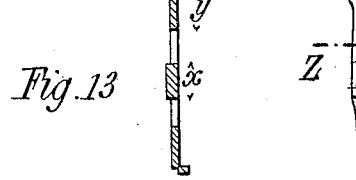
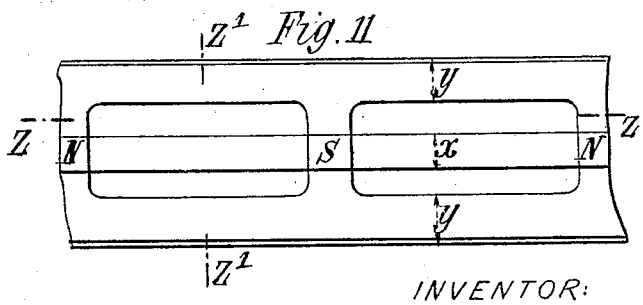
WITNESSES:
René Bruine
William F. Martinez
INVENTOR:
Charles Paul Bary.
By Attorneys,
Arthur E. Fraser & Llana

C. P. BARY.
FIELD MAGNET OR THE LIKE.
APPLICATION FILED OCT. 24, 1905.

910,892.

Patented Jan. 26, 1909.

2 SHEETS—SHEET 2.

WITNESSES:
René Muine
William F. Martinez

INVENTOR:
Charles Paul Bary.
By Attorneys.
Arthur E. Fraser

UNITED STATES PATENT OFFICE.

CHARLES PAUL BARY, OF NEUILLY-SUR-SEINE, FRANCE, ASSIGNOR TO SOCIÉTÉ ANONYME DES VOITURES ELECTRIQUES VÉDRINE, OF NEUILLY-SUR-SEINE, FRANCE.

FIELD-MAGNET OR THE LIKE.

No. 910,892.   Specification of Letters Patent.   Patented Jan. 26, 1909.

Application filed October 24, 1905. Serial No. 284,268.

*To all whom it may concern:*

Be it known that I, CHARLES PAUL BARY, a citizen of the Republic of France, residing in Neuilly-sur-Seine, Seine, France, have invented certain new and useful Improvements in Field-Magnets or the Like, of which the following is a specification.

In some industries it is necessary to have a motor capable of being run at speeds which can be easily and rapidly varied by means, such as by the operation of a rheostat for example, the ratios of the extreme necessary speeds being capable of reaching 1 to 3, or 1 to 4 or more.

Ordinary electric motors allow of obtaining rather considerable variations of speed such as 2 to 3 or even 1 to 3 if care be taken to change the positions of the brushes in accordance with the variation of speed.

In order to facilitate the understanding of the main principle on which the motors forming the subject of this invention are based, it will be first necessary to set forth the difficulty which is experienced in effecting the desired result by the ordinary means. In all motors the magnetic circuit is constituted in such a manner that the permeability of the iron of the electro-magnets diminishes with the increase of the magnetic flux flowing through the armature. This circumstance limits the value which may be attained by the maximum flux to a practical amount which cannot be exceeded without considerable expenditure of copper in the electro magnets, whereby even then only a very small increase can be obtained.

The accompanying drawings illustrate the invention more or less diagrammatically.

Figure 8:
Figure 9:
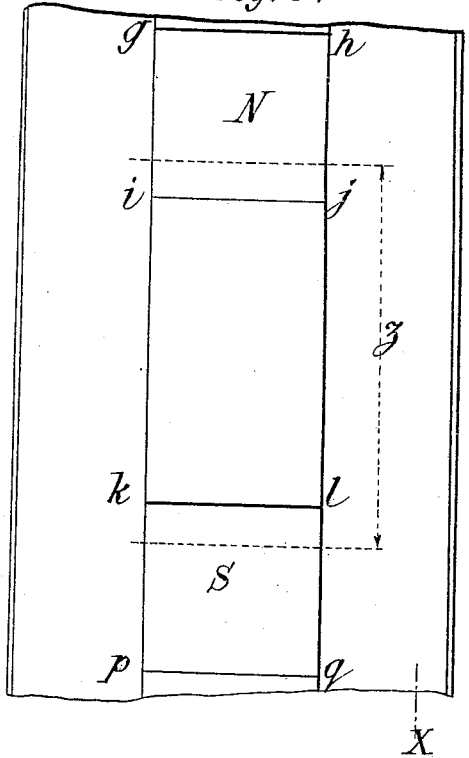
Figure 10:
Figure 7:
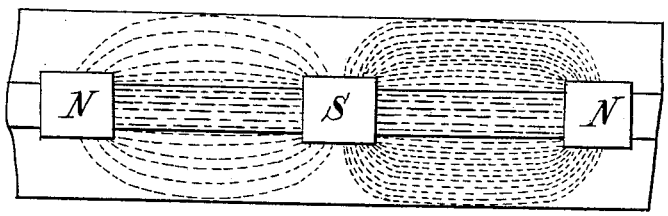

Figure 1 is a section of a motor transverse to the axis. Fig. 2 is a section parallel with the axis and along the line Y—Y of Fig. 1. Figs. 3, 4 and 5 represent different cross-sections of the field magnet. Fig. 6 is a diagram of magnetic curves. Fig. 7 is a diagram showing in plan a part of a field magnet, showing the paths followed by the lines of force, the field magnet being saturated at the right-hand side of the figure and not at the left, the density of the current in the wings of the field magnet being greater in the former case. Figs. 8, 9 and 10 show a part of the field magnet in transverse section, elevation and longitudinal section along X—X respectively. Figs. 11 and 12 show in developed plan and in transverse section along Z—Z respectively another form of magnetic circuit or field magnet in which the wings are separated throughout the portions comprised between the poles by an air gap. Fig. 13 is a transverse section on the line Z'—Z' of Fig. 11 and showing the width of the air gaps.

The question of motors or dynamos with fixed brushes is complicated only when it is desired to vary the magnetic field of the field magnet through a wide range. In fact when the poles of a motor or of a dynamo are not sufficiently saturated, there are produced sparks at the brushes, the cause of which lies in the variation of the current at each passage from one contact point of the collector to the next. The current is not absolutely continuous, and the small variations which are produced are important except when the iron is almost saturated, that is to say, when the self-induction is very weak.

Referring to Fig. 6, the curve $o$ A B represents the magnetizing function of a magnetic circuit in an ordinary motor, that is to say, the flux as a function of the magnetic force of the field magnet or of the ampere turns of the field windings. The tangent to this curve at any point represents the ratio of the magnetic force to the flux, which corresponds with the self-induction. If the angular coefficient of the tangent at the point A represents a condition in the field coil corresponding with the maximum amount of self-induction in the armature which can exist without having sparking at the brushes, it follows that the greatest variation of flux which may be utilized is represented by the difference between the points B' and A'.

It will be seen that if this magnetizing function had a straighter direction, like the curve $o$ C D, for example, the point C, where the tangent has the same angular coefficient as the tangent at the point A, corresponds to a value C' much smaller than A'. The variation of flux from D' to C' is therefore much greater than in the first curve, while remaining within the same limits which assure a satisfactory operation.

The condition to be fulfilled for obtaining a motor with wide variation of speed is therefore the disposal of the magnetic circuit in such a way that the point of maximum self-induction is low. This condition is fulfilled according to this invention.

The field magnet or frame, as indicated, has four poles, N N S S, which are narrow relatively to the width of the frame, so that for a feeble excitation the first part of the frame which is saturated is the central part, and it is only when the field in this part of the circuit commences to become sufficiently dense that the magnetic lines find an easier road, although longer, through the lateral portions. It is therefore necessary that the flux should be as nearly proportional to the excitation as possible, or at least that it should tend toward being proportional. If we assume an equation,—$\Phi = \mu H s m$,— where $s$ designates the cross-section normal to the magnetizing force, $\Phi$ the total flux, $\mu$ the permeability, H the intensity of the magnetizing field, or the magnetizing force, and $m$ a constant, then in order that $\Phi$ shall increase according to a linear law relatively to H, it is necessary that the product $\mu s$ be constant. It is impossible to prevent $\mu$ from diminishing at the same time that the induction increases. It is therefore necessary that $s$ shall increase as $\mu$ decreases. This condition is approximately filled by the arrangement described, since the effective cross-section $s$ increases, in the manner explained, with the increased excitation.

It is the armature reaction which produces sparking at the brushes (especially in machines in which the position of the brushes cannot be varied in order to follow the variations in the speed of the motor) and which also prevents the speed of the motor from being varied within wide limits.

Now the special form given in accordance with the present invention to the cores of electro magnets has for object to give to the curve shown in Fig. 6 a form which will approximate a line or at least the curve $o$ C D. In the magnet core usually employed the whole of the section whether it be rectangular as shown in the figure or be of round or any polygonal shape, is generally placed in line with the pole in such a manner that the induction at all points of that section is appreciably constant for a given value of the excitation.

Fig. 3 shows on the contrary the form which should be given to the magnet cores in order to produce an armature reaction almost independent of the value of the flux. At the center of the magnet core there is a portion O M which has a sufficient section of iron for the passage of the magnetic flux that is necessary for the highest speed. As the flux is small at this speed the portion O M of the magnet core has a low saturation and according as the excitation is increased the magnetic permeability of the portion O M diminishes and the derivations of the flux along the side O P and M Q become larger and larger. Consequently, contrary to what is the case in the usual arrangements, instead of the induction increasing more and more in the iron and thus diminishing the total permeability of the magnetic circuit, it is the effective section of the iron which increases at the moment when such increase is useful. It is clear that the total permeability of the magnetic circuit will also decrease when the excitation increases, but only by a comparatively small quantity.

Instead of employing the form of magnet core shown in Fig. 3 in which the side portions O P and M Q are of uniform thickness over their whole surface (which form has given excellent results in practice) there may be employed the forms shown in Figs. 4 and 5 which give obviously slightly different results.

All kinds of intermediate forms which would give results of the same nature may also be employed.

Fig. 7 shows the manner in which the flux is distributed. It is assumed that the field magnet frame is opened out in such a manner as to show the poles of the motor which, normally, are turned towards the armature. The left hand portion of the figure represents the distribution of the lines of force in the case of a feeble excitation, in which the greater number of lines of force are represented by lines passing directly from one pole to the other along the shortest path. The right hand portion on the contrary shows what happens when the excitation is great, namely that the lines of force which are added to those in the first case, pass more easily along a path which is a little longer but has a much greater permeability.

The description of this invention may be completed by detailing the proportions which should be given to the different parts of the magnetic circuit, cores and poles, in the case of a motor which is subject to more or less great variations of speed. As an example, there may be taken a type of motor of this system constructed with a view to its employment in electric motor cars. This motor converts into mechanical energy a mean power of 4250 watts at a tension of 85 volts with an efficiency of 85%. Its speed under full load may vary from 550 to 1600 revolutions per minute by simply varying the exciting current from 2.5 amperes to 0. When the exciting current is zero, there still remain a certain number of ampere turns supplied by a series winding which is sufficient of itself to insure the working of the motor at high speed.

Figs. 8 9 and 10 show in cross section and in plan the development of the motor having four poles and which consequently is shown only in part in the figure. The rectangles $g h i j$ and $k l p q$ indicate the surface and the position of the poles.

If T represents a surface of iron corresponding to the portion $x$, and $t$ is the section of the two side portions $y y$ it will be seen that this ratio is practically equal to 2 for speeds varying from 1 to 3, and for a length of core between poles which is equal to $z$.

In the example shown, $t$ is appreciably equal to twice $x$, but it may be smaller without changing the relative proportions of T and $t$. For values of $t$ much larger than $2x$ while keeping $t$ at about the same value, it will be necessary to increase the length $y$ very rapidly, and even to provide special devices adapted to insure a proper operation. It is advisable to point out more particularly the advantage which may be obtained in this case from the arrangement shown in Fig. 11. The poles N, S, N are connected together magnetically by a double circuit; first, the circuit $x$ which is direct and in which the flux passes almost wholly in the case of weak excitations, and second, the circuits $y$ $y$ whose length is greater and which come into operation, only when the part $x$ which is shorter has become almost saturated. The interval of space which is left between $x$ and $y$ may be almost completely denuded of iron, or may have only a very slight thickness according to the particular cases in question.

The number of magnetic circuits between the poles may be increased to more than two. If it is desired to have very large reductions of speed three, four, or more of these circuits may be employed of progressively increasing lengths.

What I claim and desire to secure by Letters Patent is:—

A field magnet for dynamos and motors and the like, having a central part with lateral prolongations, the section of the central part being twice as great as that of each of the lateral prolongations, and the distance between two poles being equal to or less than twice the width of the central part.

In witness whereof, I have hereunto signed my name in the presence of two subscribing witnesses.

CHARLES PAUL BARY.

Witnesses:
   JULES ARMENGAUD, Jeune,
   HANSON C. COXE.